(12) United States Patent
Muppirala et al.

(10) Patent No.: US 10,679,490 B2
(45) Date of Patent: Jun. 9, 2020

(54) REMOTE IDENTIFICATION OF PERSON USING COMBINED VOICE PRINT AND FACIAL IMAGE RECOGNITION

(71) Applicant: MD Enterprises Global LLC, Ann Arbor, MI (US)

(72) Inventors: Ravikumar Muppirala, Ann Arbor, MI (US); Lorne Darnell, Ann Arbor, MI (US)

(73) Assignee: MD ENTERPRISES GLOBAL LLC, Ann Arbor, MI (US)

( * ) Notice: Subject to any disclaimer, the term of this patent is extended or adjusted under 35 U.S.C. 154(b) by 0 days.

(21) Appl. No.: 16/339,742

(22) PCT Filed: Oct. 17, 2017

(86) PCT No.: PCT/US2017/056874
§ 371 (c)(1),
(2) Date: Apr. 5, 2019

(87) PCT Pub. No.: WO2018/075443
PCT Pub. Date: Apr. 26, 2018

(65) Prior Publication Data
US 2020/0058214 A1  Feb. 20, 2020

Related U.S. Application Data

(60) Provisional application No. 62/408,957, filed on Oct. 17, 2016.

(51) Int. Cl.
*G08B 23/00* (2006.01)
*G08B 25/01* (2006.01)
(Continued)

(52) U.S. Cl.
CPC ....... *G08B 25/016* (2013.01); *G06K 9/00825* (2013.01); *G06K 9/00892* (2013.01);
(Continued)

(58) Field of Classification Search
CPC ....... G08B 25/016; G08B 25/10; H04W 4/46; G06K 9/00825; G06K 9/00892; G06K 2209/15
(Continued)

(56) References Cited

U.S. PATENT DOCUMENTS 6,982,654 B2 * 1/2006 Rau ................ G08G 1/0175
340/539.1
7,356,474 B2   4/2008 Kumhyr
(Continued)

OTHER PUBLICATIONS

International Search Report dated Dec. 4, 2017.

*Primary Examiner* — Zhen Y Wu
(74) *Attorney, Agent, or Firm* — Brinks Gilson & Lione

(57) ABSTRACT

A system and method for remote identification of a person includes the steps of contacting the person using contact information provided from a database or utilizing information received from the person via a message broadcast using GPS-fencing. After contacting the person, receiving current biometric information from the person and confirming the identification of the person when the current biometric information is recognized by comparing the current biometric information to the previously collected biometric information of the person in the database.

23 Claims, 17 Drawing Sheets

(51) Int. Cl.
*G06K 9/00* (2006.01)
*H04W 4/46* (2018.01)
*G08B 25/10* (2006.01)

(52) U.S. Cl.
CPC .............. *G08B 25/10* (2013.01); *H04W 4/46* (2018.02); *G06K 2209/15* (2013.01)

(58) Field of Classification Search
USPC ....................................................... 340/573.1
See application file for complete search history.

(56) References Cited

U.S. PATENT DOCUMENTS

| | | | |
|---|---|---|---|
| 8,633,815 B2 | 1/2014 | Al-Harbi et al. | |
| 8,768,009 B1 | 7/2014 | Smith | |
| 10,178,534 B2* | 1/2019 | Barash | G08B 27/001 |
| 2006/0020630 A1 | 1/2006 | Stager et al. | |
| 2006/0222156 A1 | 10/2006 | Smith et al. | |
| 2007/0093234 A1* | 4/2007 | Willis | G06F 21/6245 |
| | | | 455/410 |
| 2010/0111377 A1 | 5/2010 | Monroe | |
| 2012/0121133 A1* | 5/2012 | Park | G06K 9/00221 |
| | | | 382/103 |
| 2012/0249328 A1* | 10/2012 | Xiong | G10L 15/22 |
| | | | 340/541 |
| 2013/0036058 A1* | 2/2013 | Kelly | G06Q 20/322 |
| | | | 705/67 |
| 2013/0290201 A1* | 10/2013 | Rodriguez Carrillo | G06Q 50/30 |
| | | | 705/318 |
| 2013/0297387 A1* | 11/2013 | Michael | G08G 1/0112 |
| | | | 705/13 |
| 2013/0304646 A1 | 11/2013 | De Geer | |
| 2015/0085999 A1 | 3/2015 | De Los Reyes et al. | |
| 2015/0113012 A1* | 4/2015 | Silver | H04L 51/38 |
| | | | 707/758 |
| 2015/0187359 A1* | 7/2015 | Bhaskaran | G10L 15/265 |
| | | | 704/235 |
| 2015/0363586 A1* | 12/2015 | Klevan | G06F 21/32 |
| | | | 726/19 |
| 2016/0063235 A1* | 3/2016 | Tussy | G06K 9/00288 |
| | | | 726/6 |
| 2016/0125415 A1* | 5/2016 | Mardikar | G06Q 20/40145 |
| | | | 705/44 |
| 2016/0132743 A1 | 5/2016 | Ekin | |
| 2016/0269411 A1* | 9/2016 | Malachi | H04L 63/10 |
| 2016/0277439 A1* | 9/2016 | Rotter | H04L 63/0861 |
| 2016/0307156 A1* | 10/2016 | Burner | G06Q 10/10 |
| 2016/0371697 A1* | 12/2016 | Auvenshine | G06Q 20/4016 |
| 2017/0039356 A1* | 2/2017 | Brewer | G06F 21/32 |
| 2018/0096354 A1* | 4/2018 | Kohli | G06Q 20/40145 |
| 2018/0186309 A1* | 7/2018 | Batten | B60R 13/10 |
| 2018/0190040 A1* | 7/2018 | Batten | G06Q 20/085 |
| 2018/0374278 A1* | 12/2018 | Mole | G06K 9/00785 |

* cited by examiner

REMOTE IDENTIFICATION OF PERSON USING COMBINED VOICE PRINT AND FACIAL IMAGE RECOGNITION

CROSS-REFERENCE TO RELATED APPLICATION

This application is claims priority to PCT Application No. PCT//US2017/056874, filed Oct. 17, 2018, which claims the benefit of priority to U.S. Provisional Patent Application 62/408,957, filed on Oct. 17, 2016, the contents of which is herein incorporated by reference in its entirety.

BACKGROUND

1. Field of the Invention

The present invention relates to systems and methods for identification of a person.

2. Description of Related Art

There are many instances in which one person is required to confirm the identity of a person unknown to them. In some of these instances, there is a genuine risk of serious injury to the person attempting to confirm identity. For example, a Law Enforcement Officer ("LEO") engaged in the action of stopping traffic violators, known or suspected misdemeanants, and for conducting field interviews of suspicious persons must ascertain a person's identity, typically in close physical proximity to the person. There is, of course, a very serious risk of injury to the LEO in cases where the person being approached is violent and disrespectful to authority. For this reason, LEOs have developed multi-step procedures to help reduce the risk of injury to themselves and others. These disciplined procedures may include any one or more of the following steps below.

Pre-stop procedures may include evaluating reasonable suspicion for the stop, recalling recent bulletins and notices, physically writing down the license number down, noting the number of occupants in the vehicle, making a radio transmission describing the vehicle and other relevant details, turning on flashing lights, and the like.

Pull-over procedures may include assessing geographic location, intentionally positioning the police vehicle, turning on lights for improved visibility, signaling with a horn, observing occupants' movements, increasing the volume of the police radio, and the like.

Only after all of these disciplined procedures have been completed, will the careful LEO attempt to opening direct personal contact with the person. At this stage, the LEO's attention must be focused on the occupants of the suspect vehicle. If any of these procedures are missed, the risk of injury to the LEO and/or other people is likely to increase. It is well-documented that the most dangerous time for an LEO is before the police car is stopped and parked and the suspected person is in a covered position. Therefore, rigorous discipline to execute these safety procedures adds to an LEO's work-stress and consumes valuable working time. Not to mention, an extended period of the time of the person stopped is also consumed by these safety procedures.

Personal validation of a person's identification ("ID") typically requires the LEO (or a n other authority figure) to be in relatively close physical proximity with the suspect. Close proximity enables violent people to commit violent actions. An LEO's legitimate concern about their safety, or the personal safety nearby civilians, very naturally leads to LEOs assuming a presumptive mindset of suspicion against each person they confront. This, in turn, fosters the potential for misunderstandings among all concerned. When coupled with the occasional human error or misjudgment, could even lead to assaults or fatalities. Indeed, the growing instances of people and/or LEOs injured or killed during routine traffic stops exemplify the gross inadequacies that exist in the context of validating a person's identity. To date, there have not been any meaningful solutions advanced that have a realistic chance to improve in the current trend.

SUMMARY

There have been examples in the U.S. involving inadequacies of validating and personal identity and the necessary physical proximity to validate personal ID cards leads to some misunderstanding in retrieving them. This has resulted in escalation of misunderstanding, and when coupled with misjudgments has led to assaults as well as fatalities, in some circumstances.

The current process is to validate the identity of a person, say for example when an LEO stops a suspect vehicle, is to physically walk to the person, ask for ID and examine that manually. In this process, there appear to be many possible misunderstandings that can lead to violence, as is evidently seen in current affairs. As far as we know, there has been no clear process developed to resolve this issue without being in close physical proximity, and methods and systems described is a way of solving this problem, by validating the personal identity, remotely. Also, we propose to utilize voice-print in an extremely creative and novel way. While voice-print to validate identity is being explored, there has been no definitive way to tie and reference the person to their voice-print. This application provides a definitive way/mechanism to populate the voice database to uniquely tie-up with other previously known biometrics (Know Your Customer, "KYC") and reference a person to that person's voice-print. This is accomplished by a driver-renewal app that can collect voice-print in conjunction with other verifiable personal identity information, such as facial image recognition. Also, we provide a process to collect voice-print data with predefined formats to enable accurate validation of identity; for example, either with predefined phrases or with constant phrases in conjunction with their name. Also, we are utilizing the cloud-technology in a novel way to request a voice-print remotely and send and validate them remotely.

The idea is to allow remote electronic identification and verification through voice-print and facial-recognition utilizing cloud-based technologies working in conjunction with mobile technologies. For instance, using this process, an LEO can confirm that the person in the suspected car is indeed that person in the car. The whole idea is to accomplish all this without anyone getting out of the car. It can also be used to obtain access to a secure area using voice-print as a biometric or to complete a financial transaction over the phone with additional voice-print as a security measure.

It Encompasses—

Technology that is run in a kiosk (or otherwise, as for example handheld) that utilizes combination of software (running on mobile devices such as tablets and phones) and hardware (may be involving peripherals to collect audio, video and biometric information) to validate, renew and generate physical and/or electronic identification of persons validating their eligibility to belong to a corporation/organization/'gubernatorial body' and/or to carry specific permissions to carry out certain function such as driving motor vehicles, accessing a secured building or validating a financial transaction.

Mobile Technology App to be used by an LEO, that can validate the identification of a suspect, utilizing voice-recognition technologies in conjunction with cloud technology. A mobile app that can run on any smartphone (or a tablet) that carries a digital personal aid or an enhanced electronic driver license, which may have special features for voice and photo with technologies that tie into verifying personal identity.

A method for remote identification of a person includes the steps of contacting the person using the contact information provided from a database or utilizing information received from the person via a message broadcast using GPS-fencing. After contacting the person, the next steps are to receive current biometric information from the person and confirm the identification of the person when the current biometric information is recognized by comparing the current biometric information to the previously collected biometric information of the person in the database.

In one example, the system may include a cloud-based database and a mobile data terminal. The cloud-based database has data cross-referencing an identifying marker of the person to contact information of the person and previously collected biometric information of the person. The mobile data terminal may be configured to communicate with the cloud-based database and the person.

The mobile data terminal is further configured to receive an identifying marker of the person, transmit the identifying marker to the cloud-based database, receive contact information of the person from the cloud-based database, contact the person using the contact information provided from the database, receive current biometric information from the person, transmit current biometric information from the person to the cloud-based database, and receive a confirmation communication of the identification of the person from the cloud-based database when the current biometric information is recognized by comparing the current biometric information to the previously collected biometric information of the person in the cloud-based database.

Further objects, features, and advantages of this invention will become readily apparent to persons skilled in the art after a review of the following description, with reference to the drawings and claims that are appended to and form a part of this specification.

DETAILED DESCRIPTION

The present disclosure allows LEO to do remote electronic identity verification through a combination of voice-print and facial recognition essentially confirming that the person in the car is indeed that person in the car. The whole idea is to accomplish all this without either party (LEO or suspect) getting out of the vehicle.

Figure 1A:
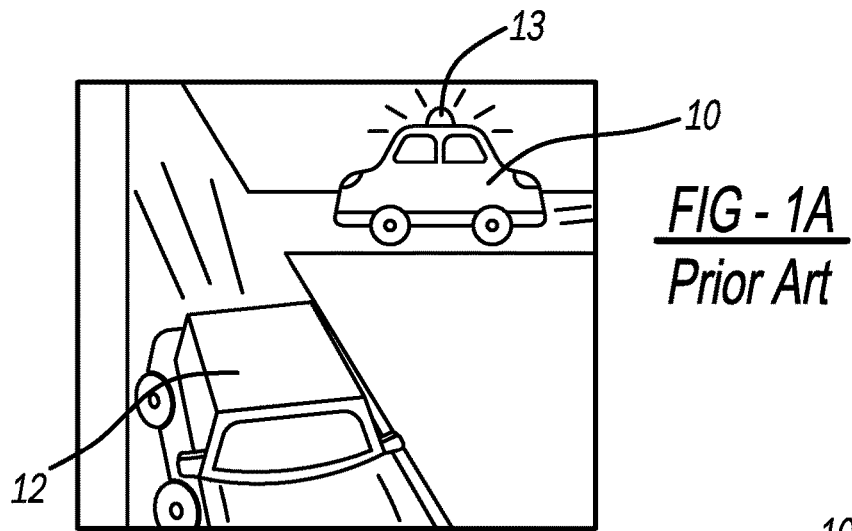
FIGS. 1A-1C illustrate a prior art procedure for an LEO to pull over a person and to confirm the identity of the person.
Figure 1B:
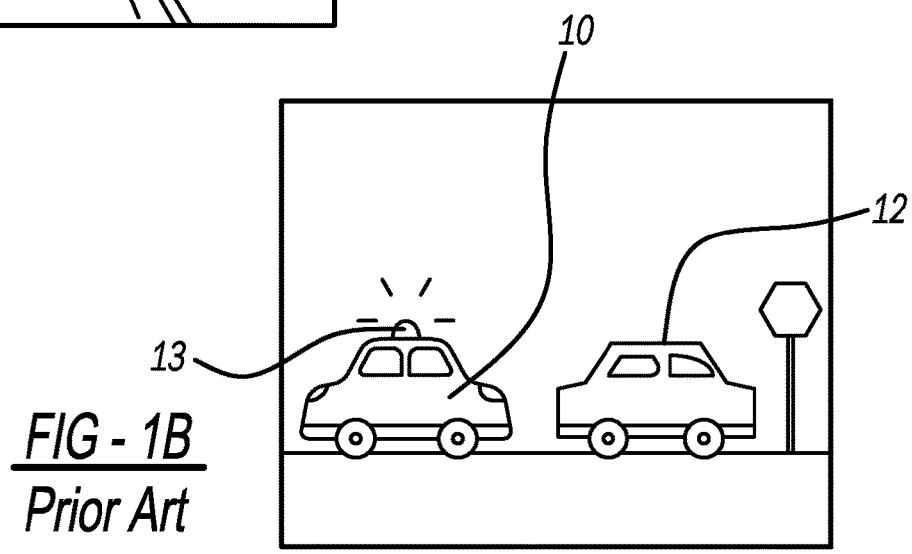
Figure 1C:
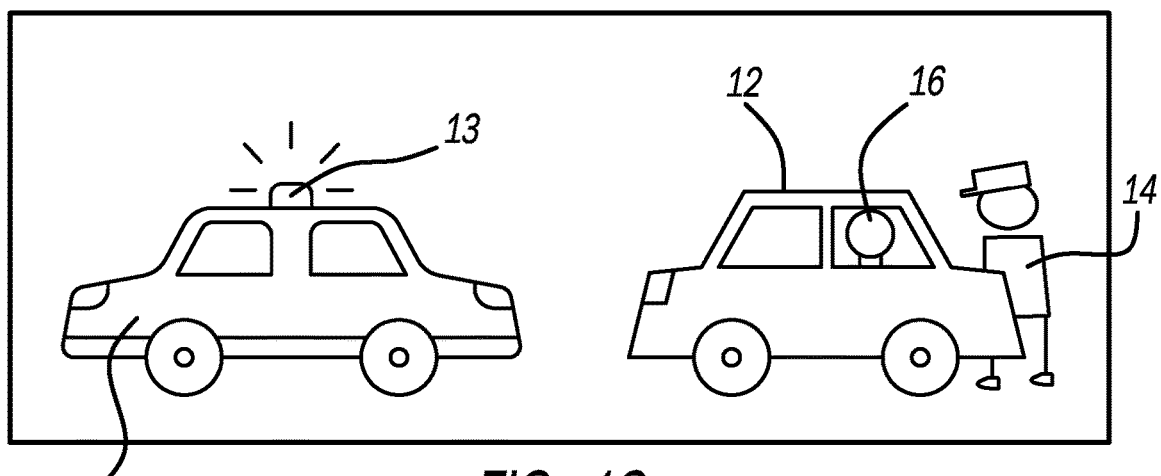

Referring to FIGS. 1A-1C, an explanation of a prior art procedure regarding how an LEO pulls over a person or suspect in a vehicle is shown. In FIG. 1A, the LEO vehicle 10 determines to pursue a suspect vehicle 12. Generally, this is done by having the LEO vehicle 10 turn on a siren and/or flashing lights 13 to inform the person within the vehicle 12 that the LEO wishes to pull over the person. As shown in FIG. 1B, eventually, the suspect vehicle 12 pulls over, and the LEO vehicle 10 pulls over right behind the suspect vehicle 12.

As shown in FIG. 1C, after the suspect vehicle 12 and LEO vehicle 10 have pulled over, the LEO 14 gets out of the LEO vehicle 10 and proceeds to walk towards the suspect vehicle 12. While it is normal for the LEO vehicle 10 to continue flashing the lights 13 to warn other vehicles nearby to practice caution in the area, it is not uncommon for other vehicles to potentially damage either the LEO vehicle 10, the suspect vehicle 12, or more unfortunately, injure or kill the LEO 14 as he/she proceeds to come into contact with the person 16 within the suspect vehicle 12. Another kind of unfortunate scenarios have been due to inclement weather such as snow, slipper road or dust storms which have led to fatalities when the LEO 14 is proceeding to the suspect vehicle 12.

Additionally, when the LEO 14 exits his/her vehicle 10, there is always a possibility that the person 16 will drive their vehicle 12 away from the LEO 14 in an effort to escape any questioning from the LEO 14. In order to catch the person 16, the LEO 14 must return to his/her vehicle 10 and continue to pursue the suspect vehicle 12 as previously described in FIGS. 1A and 1B.

Furthermore, there have been incidents involving the conduct between the LEO 14 and the person 16. These incidents mostly are situations where the person 16 enters into a physical altercation with the LEO 14, prompting the LEO 14 to utilize force and, in some cases, deadly force. Also, unfortunately, there are incidents where the LEO 14 acts improperly with regard to the person 16 and utilizes physical force or even deadly force inappropriately and unethically.

Figure 2A:
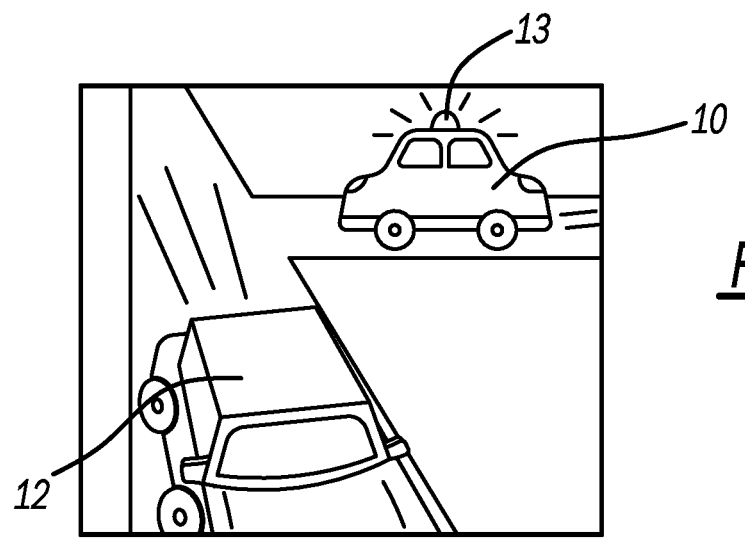
FIGS. 2A and 2B illustrate an example of an improved procedure for the LEO to pull over the person and confirm the identity of the person.
Figure 2B:
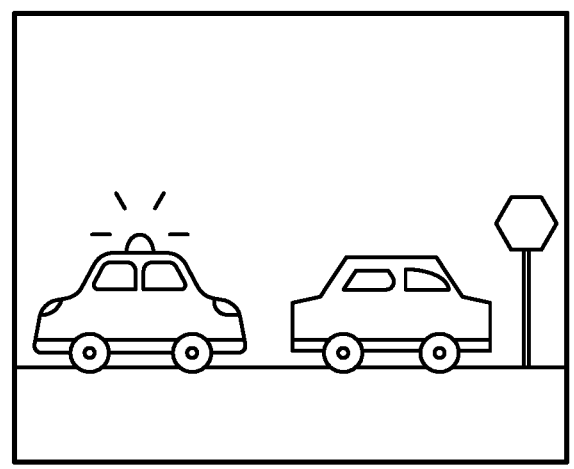

FIGS. 2A and 2B illustrate a new and improved system and method to identify the person 16 but also minimize contact between the LEO 14 and the person 16 so as to avoid any unfortunate incidents between the LEO 14 and the person 16. This also provides a measure of safety to the LEO 14 from any oncoming traffic or inclement weather conditions. The system described in the following paragraphs essentially allows the LEO 14 to stay within the vehicle 10 and allow the LEO 14 to properly identify the person 16 and issue any citations. By so doing, the LEO 14 has a better sense of protection within the vehicle 10 and can call for backup if the identified person 16 is indeed dangerous.

Referring to FIG. 2A, the LEO vehicle 10 turns on its siren and/or lights 13 to notify the person 16 within the vehicle 12 that they wish to pull them over. In FIG. 2B, both vehicles 10 and 12 are pulled over on the side of a road. Like before, the LEO vehicle 10 may continue to flash its lights 13 to warn oncoming traffic of its location to avoid any potential accidents.

Figure 3A:
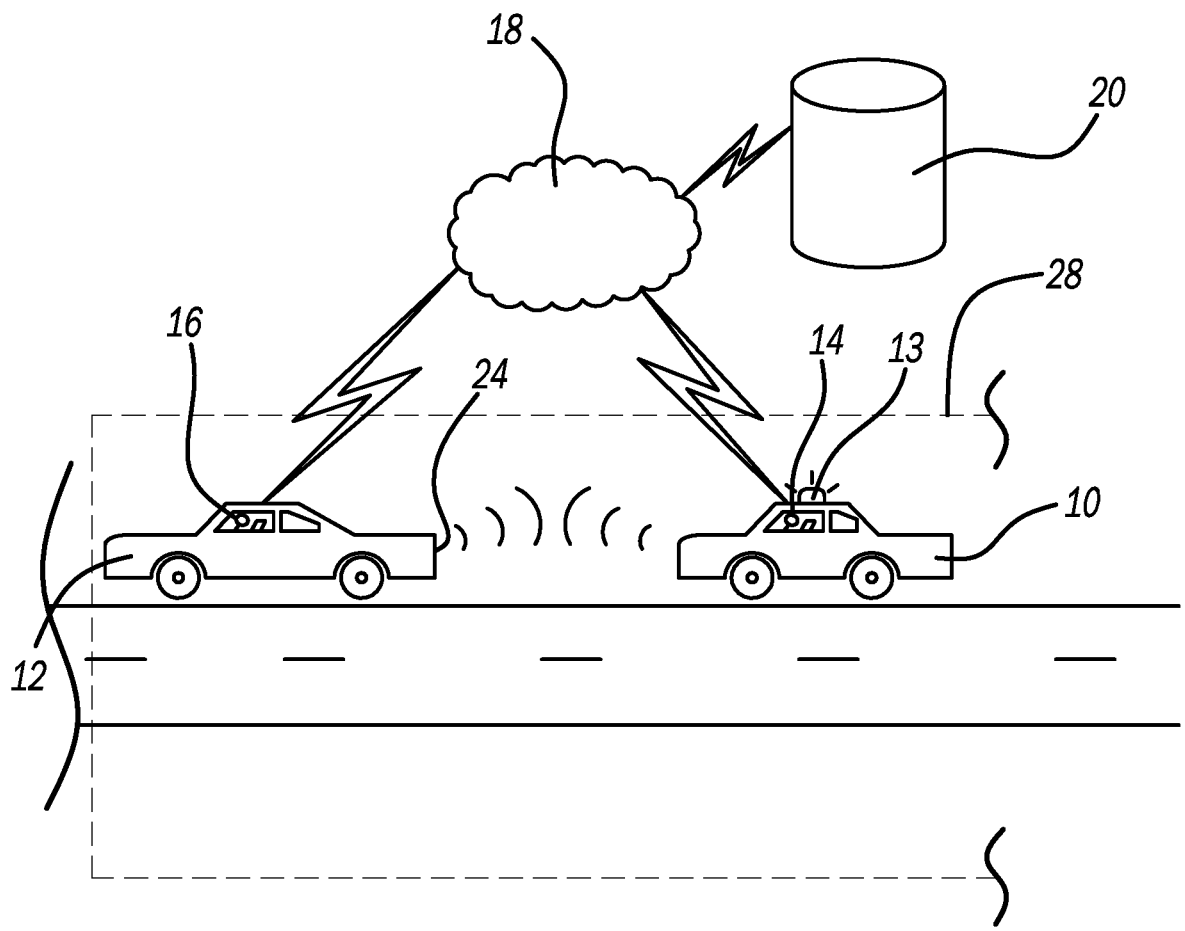
FIGS. 3A and 3B further illustrate the example of FIGS. 2A and 2B.
Figure 3B:
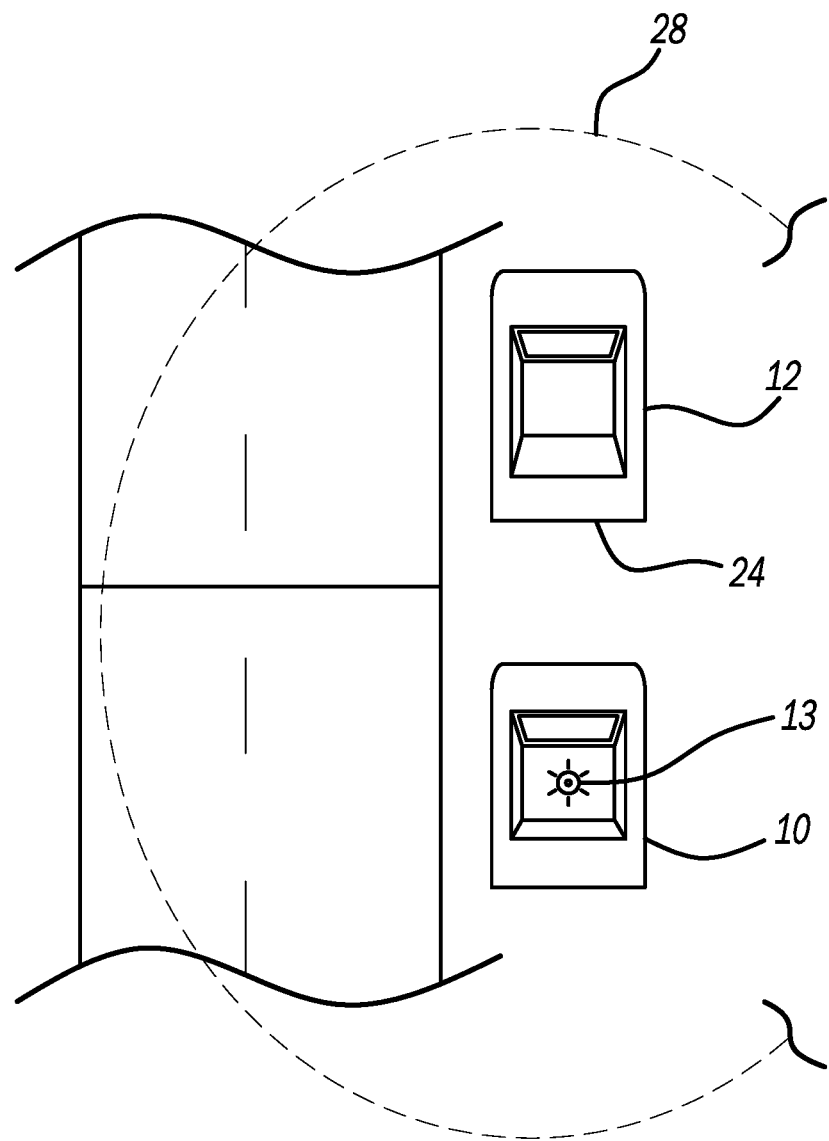

Referring to FIGS. 3A and 3B, a more detailed view of the system for identifying the person 16 is shown. Like before, here is shown a situation where the LEO 14 has pulled over a person 16. As will be described in the paragraphs that follow, the LEO vehicle 10 has a mobile data terminal located within it. The mobile data terminal is configured to communicate with a database 20 via a cloud 18. In addition, the mobile data terminal also has the ability to communicate with a mobile device, such as a phone, in possession of the person 16 using cellular data 22. The mobile device of the person 16 also has the ability to communicate with the mobile data terminal of the LEO vehicle 10 via the cloud 18.

While much more detail will be given regarding the methodology for identifying the person 16, a brief description of how the person 16 will be identified will be described. The general idea is an improved methodology for getting a driver's license; a driver renewing an application will simply go to Secretary of State ("SOS") office or Department of Motor Vehicles ("DMV") or some equivalent and go to a self-serve kiosk and swipe their current driver's license, so that the kiosk can pull up from the SOS database the current driver information so that the renewal application proceeds to a quick completion process. The driver can update their address on the digital kiosk and can take a picture over and over again till the driver applicant is happy with the picture; and most importantly can record, voluntarily their voiceprint. Lastly, they swipe a credit card for payment, and they receive their driver's license mailed two weeks later, but concurrent with that we are taking the same information and make sure it's available in the in the cloud for use with a free app-download electronic driver's license from SOS office and with that download once the person is registered their app to the device their digital driver's license is made immediately. That Digital driver's license is the first step in the methodology. The methodology allows to get the new digital driver's license and populate that information on the eDB app and will also carry the functionality to transmit voice and facial information to the SOS/DMV cloud.

The second part is to protect the LEO. When an LEO pulls someone over, without the use of in-car telematics, the police officer will simply verify that the license is valid on the vehicle that is being pulled over and confirm who is the owner of the vehicle, who's driving it; from there police officer would dial the number of the applicant that is registered to the car and ask them to speak their full name as it appears on the driver's license in order to confirm that they are indeed the driver of the car.

As an alternative, facial-recognition could also be used or some combination. In either case, that information is transmitted to the cloud for validation, and the result is sent back to the police officer without him getting out of his car. The officer can then decide whether to proceed safely to that car for further investigation. If it's a simple traffic violation, the officer could speak to the applicant and explain what the violation was and try to get them to agree right there that 'yes' they were speeding (or whatever the violation may be). At that point no paper ticket needs to be issued. The police officer can register the ticket and have it sent directly to that driver's license address as it appears on the card or to email (that can be collected during the renewal at SOS/DMV).

In order to perform remote identification of the person 16, the LEO 14 may first determine an identifying marker of the person 16. The identifying marker of the person 16 could be the license plate of the vehicle 12 having a license plate number. As it is well known, the license plate is issued by a government entity, such as a state, and provides an alphanumeric code or license plate number. This alphanumeric code can be utilized by the database 20 to cross-reference related information, such as the identity of the person 16 or contact information of the person 16.

The mobile data terminal within the vehicle 10 provides this information to the database 20 via the cloud 18. The database 20 then provides the mobile data terminal with contact information of the person 16. This can be accomplished because the database 20 contains data that cross-references the identifying marker 24 of the person 16 to the contact information of the person 16. In addition to providing the contact information, the database 20 also provides the mobile data terminal previously collected biometric information of the person 16.

In the event the identifying marker 24, such as a license plate is not present or is incorrect or in the situation where the person 16 is not identified in the contact information associated with the identifying marker 24 such as is the situation when a person drives another's vehicle, the LEO 14 may get in contact with the person 16 by transmitting cellular data 22 from the mobile data terminal to the mobile device of the person 16.

This cellular communication is essentially broadcasting to any mobile device within a geo-fenced area, as indicated by dash-lined 26. Geo-fencing (geofencing) is a feature in a software program that uses the global positioning system ("GPS") or radio frequency identification ("RFID") to define geographical boundaries. Additionally, this technology allows the LEO 14 via a mobile data terminal to broadcast a message to any mobile device with the geo-fenced area. The type of communication may vary but could be a text message containing an indication to call the LEO 14 at a predetermined phone number. Upon receiving this, the person 16 should call the LEO 14. Afterwards, it is assumed that the person 16 will provide the LEO 14 with an identifying marker of the person 16, usually the person's name, but could be other identifying markers such as social security number, etc. Like before, after receiving this identifying marker the LEO 14 provides this to the database 20 via the cloud 18 to receive any further information, such as contact information of the person 16 as well as the person's biometric information.

After being in contact with the person 16, the mobile data terminal receives current biometric information from the person. This current biometric information could include voice information or could include visual information, such as a two-dimensional or three-dimensional facial recognition information captured by the camera of the person's mobile device. Once this information is collected, a determination is made either by the database 20 or by the mobile data terminal within the vehicle 10 if the current biometric information provided by the person 16 is recognized by comparing the current biometric information of the person to the previously collected biometric information of the person that was provided from the database 20.

Figure 4A:
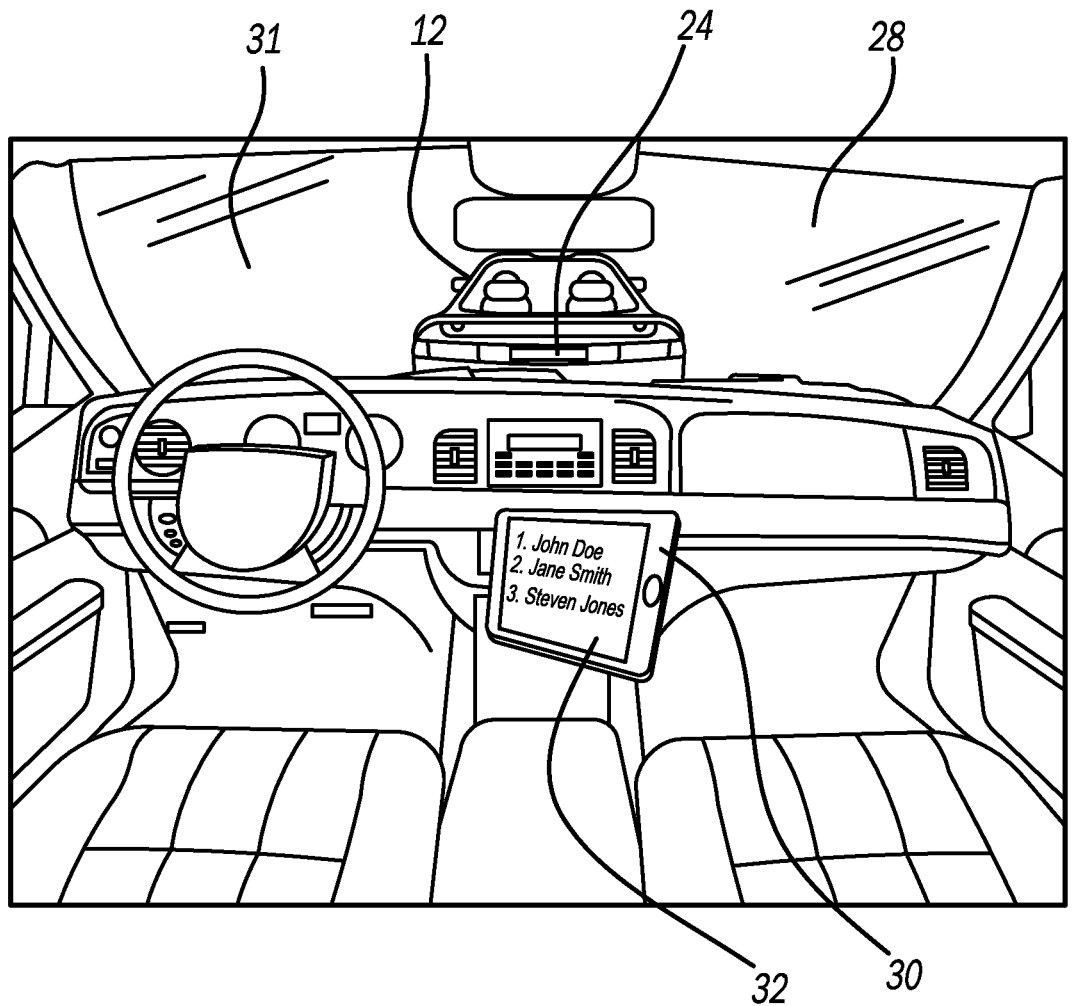
FIGS. 4A and 4B illustrate the mobile data terminal utilized by the LEO.

Referring to Figures to 4A and 4B a more detailed description of the mobile data terminal 30 is shown. The mobile data terminal 30 may be located within a cockpit 28 of the LEO vehicle 10 to allow the LEO 14 to interact with the mobile data terminal 30. In FIG. 4A, the person's vehicle 12 can be seen through a windshield 31 of the LEO vehicle 10. Also can be seen the identifying marker 24, in the form of a license plate. As mentioned earlier, if this identifying marker is not available, the mobile data terminal 30 can broadcast a cellular signal to the mobile device of the suspect to call the LEO and provide an identifying marker to the LEO. Once the identifying marker has been provided to the database 20 via the mobile data terminal 30 through the cloud 18, the mobile data terminal 30 may provide the names and contact information of the suspect to the LEO via a display device 32.

Figure 4B:
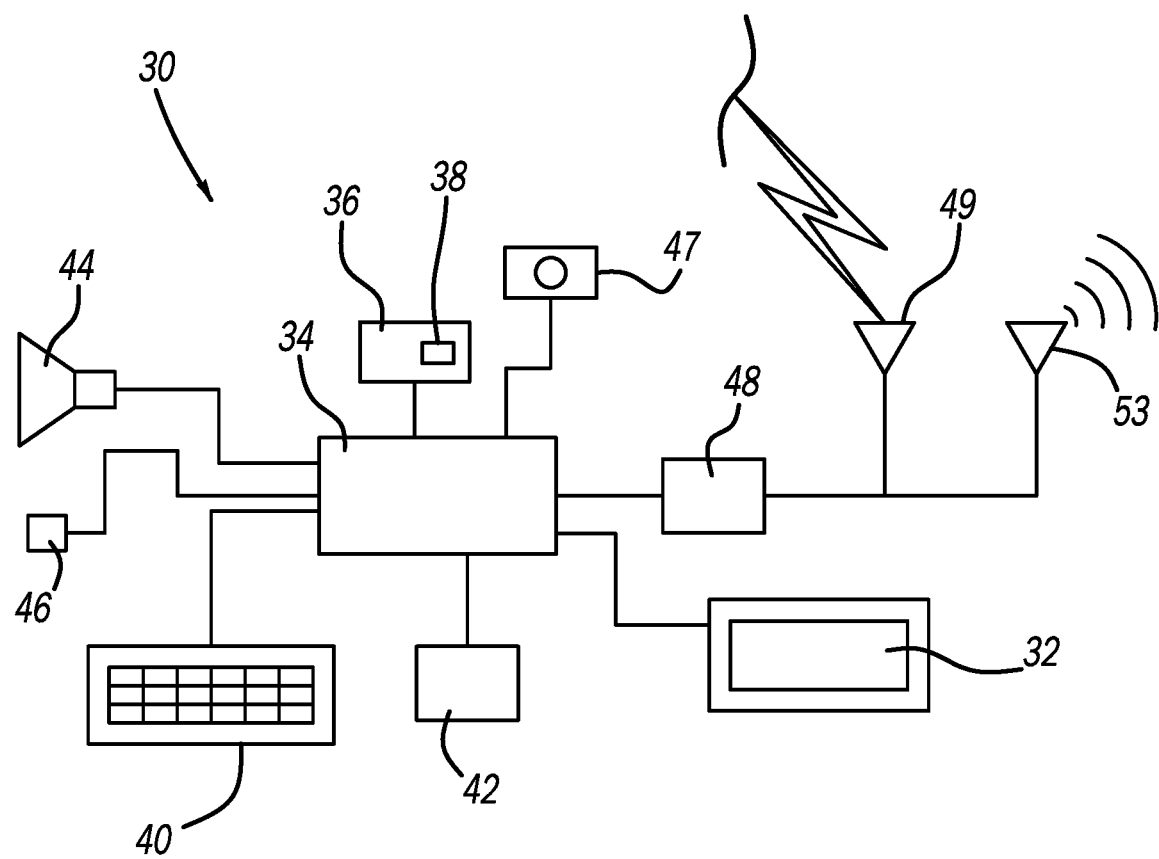

Referring to FIG. 4B, a block diagram of the mobile data terminal 30 is shown. The mobile data terminal 30 may include a processor 34. The processor 34 may be a single processor or may be multiple processors working in concert. The processor 34 is connected to a memory device 36, which may be any memory device capable of storing digital information. It should be understood that the memory device 36 might be a solid-state storage device, a magnetic storage device, optical storage device, or any device capable of storing digital information. Additionally, it is also possible that the memory device 36 is integrated within the processor 34. As will be explained later, the memory device 36 contains instructions 38 to direct the processor to execute any one of a number of different methods disclosed in this specification.

The processor 34 may also be connected to the previously mentioned display device 32 that is capable of displaying information to the LEO 14. The mobile data terminal 30 may also include input devices that are in communication with the processor 34. As an example, this version of the mobile data terminal 30 includes a keyboard 40 and a touch screen 42. The touch screen 42 may be separate from the display device 32 or may be integrated to overlay in the display area of the display device 32.

The processor 34 may also be in communication with a speaker 44 for outputting audio information and a microphone 46 for receiving audio information from the LEO 14. Additionally, the processor 34 may be in communication with a camera 47 that may be positioned to capture images from any one of a number of different viewpoints. For example, the camera 47 may be a single camera or may be multiple cameras capturing the scene around the LEO vehicle 10, and may be able to capture license plate information from the marker 24 on the person's vehicle 12 and automatically provide this to the database 20.

In order to communicate with the database 20, the processor 34 may also be in communication with a network access device 48. The network access device 48 is in communication with one or more antennas 49 and 53. The antenna 49 is such that is capable of transmitting information via a wireless network to the database 20 of FIG. 3A. Additionally, the network access device may be in communication with the cellular antenna 53 capable of transmitting either cellular information to the cloud or the cellular information to the mobile device of the suspect.

Figure 5A:
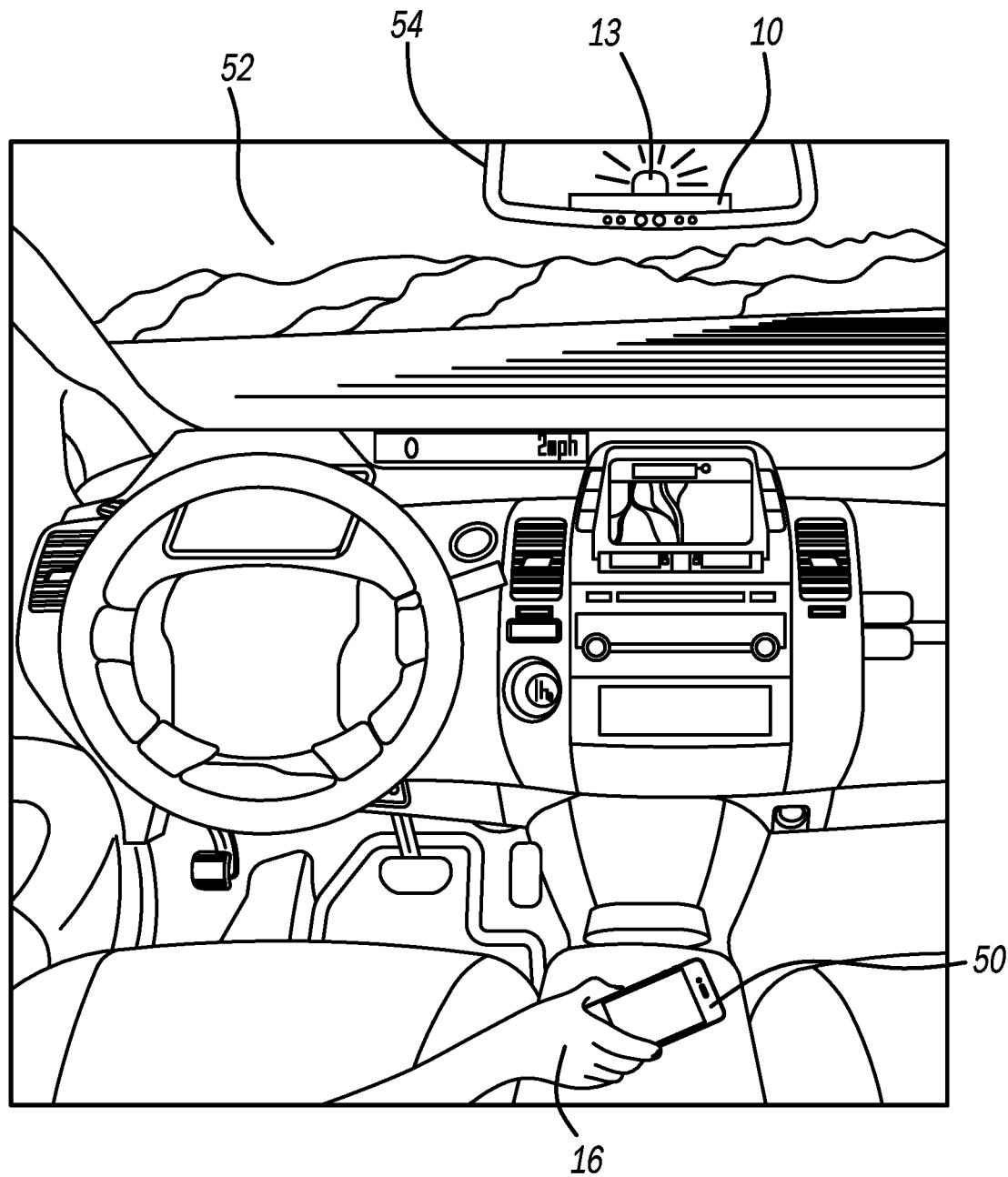
FIGS. 5A and 5B illustrate the mobile device utilized by the person pulled over by the LEO.
Figure 5B:
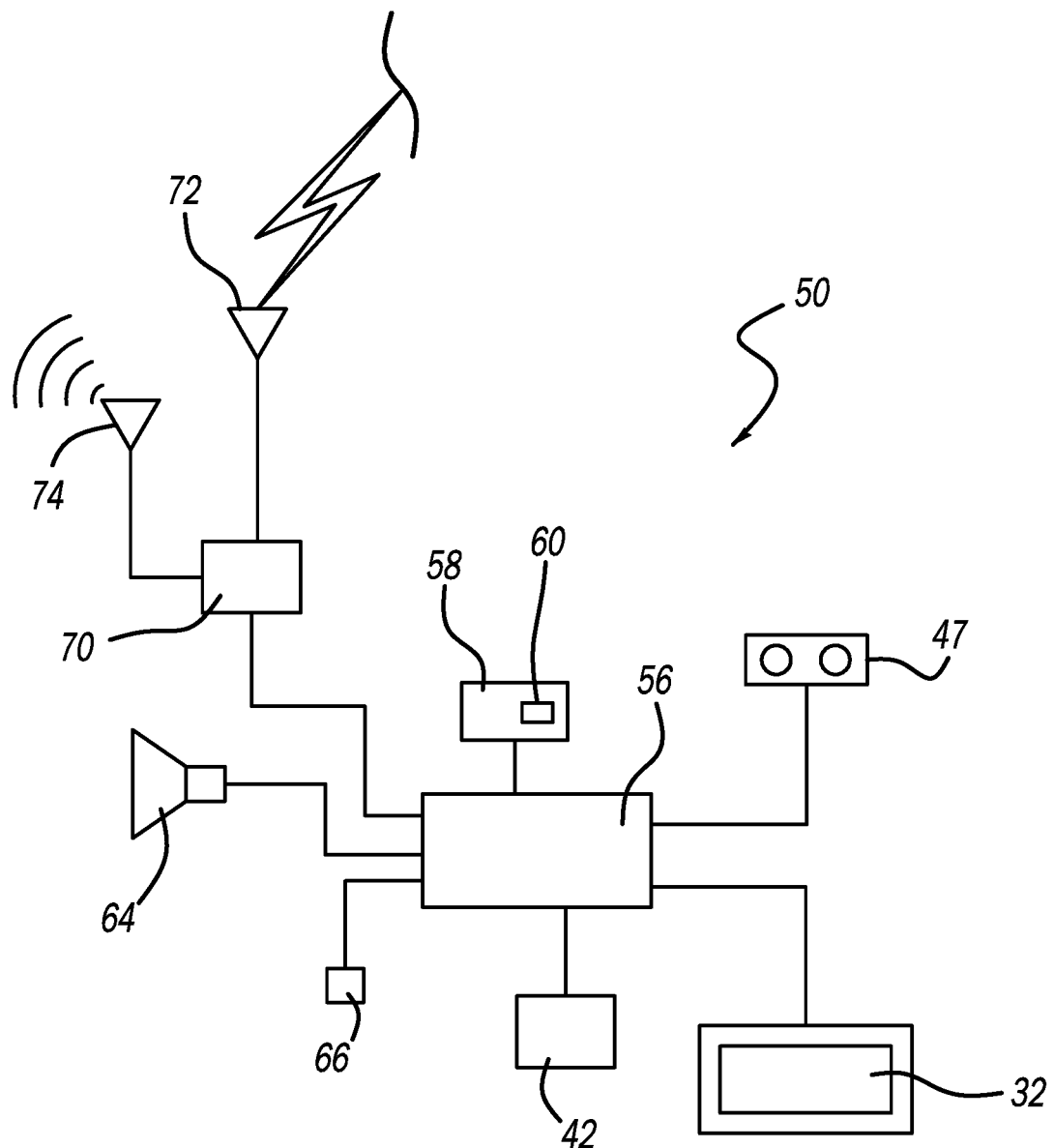

Referring to FIGS. 5A and 5B, the mobile device 50 of the person 16 will be shown and described. FIG. 5A shows the cockpit 52 of the person's vehicle 12. Located in a rearview mirror 54 of the person's vehicle 12 is a reflection of the LEO vehicle 10, which has pulled over the suspects' vehicle. When pulled over by the LEO, the person 16 may be in contact with the LEO via the mobile device 50. As stated briefly before, the LEO may contact the mobile device 50 of the person 16 by utilizing contact information provided by the database 20 or could provide a broadcast message to any mobile device within a specified radius of the LEO vehicle 10.

FIG. 5B illustrates a more detailed view of the mobile device 50. Here, the mobile device 50 includes a processor 56 that is in communication with a memory device 58. The memory device 58 may be any memory device capable of storing digital information, such as solid-state memory, optical, magnetic, and the like. The memory 58 may contain instructions 60 to instruct the processor 56 to perform any one of a different of methodologies disclosed in this specification. Additionally, the instructions 60 may be in the form of an application (referred to as an app), that may contain information related to the person 16. For example, the app 60 may include driver license information and biometric information that could then be communicated to the mobile data terminal 30 of the LEO vehicle 10.

The mobile device 50 also has a display device 62 for displaying information to the person 16. The mobile device 50 may also include one or more speakers 64 for relaying audio information to the person 16. As for input devices, the mobile device 50 may include a microphone 66 for receiving audio information from the person 16 and may include a touch screen 68 for receiving touch inputs from the person 16. The touch screen 68 may be separate from the display device 62 or may be overlaid on top of the display area of the display device 62 as is common with many mobile phones.

Additionally, the mobile device 50 may also include a camera 76. The camera 76 may be a single or multiple cameras capable of capturing two-dimensional or even three-dimensional images.

In order for the mobile device 50 to communicate with the database 20 in FIG. 3A, the processor 56 is in communication with a network access device 70 that is in communication with at least one antenna 72 and 74. Here, the antenna 72 is configured to communicate with the cloud 18 and therefore the database 20, while the antenna 74 is configured to transmit and receive cellular information.

Figure 6:
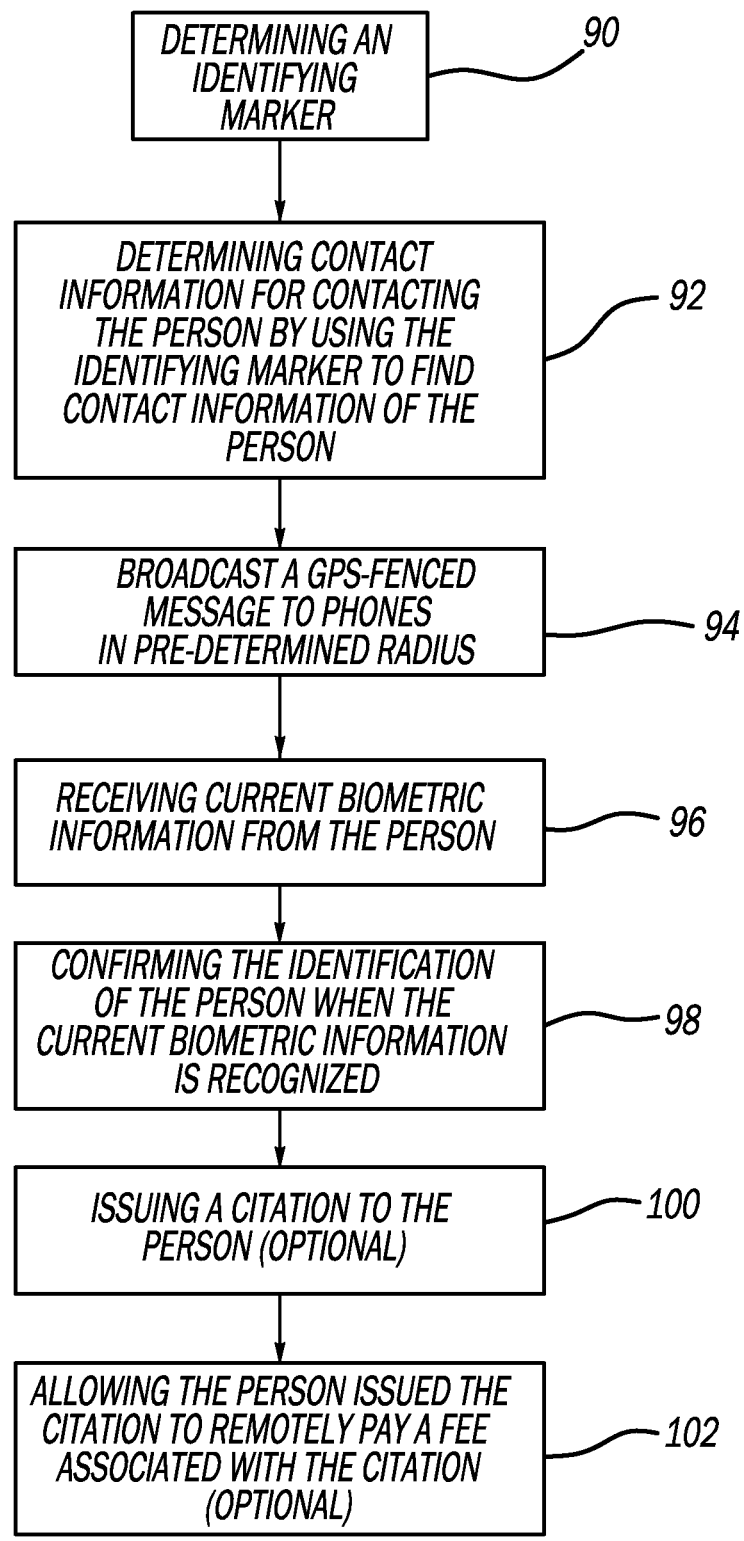
FIG. 6 illustrates a method for remotely confirming the identity of the person.

Referring to FIG. 6, a flowchart of the method for determining the identity of a person is shown. In step 90, the LEO determines an identifying marker of the suspect. As previously stated, the identifying marker 24 may be something from the vehicle providing some form of identity, such as a license plate. In step 92, a determination is made regarding the contact information for contacting the person by using the identifying marker 24 to find contact information of the person.

The identifying marker is provided to the database 20 of FIG. 3A which then cross-references this identifying marker with one or more identities of the person 16. In addition to identifying the person 16, the database may also provide LEO 14 via the mobile data terminal 30 contact information of the person 16 so as to allow the LEO via the mobile data terminal 30 to get in contact with the person 16.

In addition, as shown in step 94, the mobile data terminal 30 can broadcast a GPS fenced message to phones in a pre-determined radius. Phones or mobile devices in the pre-determined radius all receive the GPS message. Thereafter, the person 16 receiving this GPS message that is pulled over by the LEO 14 can then contact the LEO 14 through any one of a number of different methodologies listed in the GPS fenced message. For example, the person 16 may be provided a telephone number to dial. This telephone number, when dialed, would place the person 16 into contact with the LEO 14.

As such, in step 96 the person is contacted using either the contact information provided by the database and/or when the person 16 response to the GPS fenced message and contacts the LEO 14. In step 98, biometric information is received from the person 16.

This biometric information is the current biometric information and may be the voice of the person such as requesting the person or suspect to say their name into the microphone 66 of the mobile device 50 or could be an image of the suspect taken by the camera 76 of the mobile device 50.

In step 100, in order to confirm the identification of the person 16, the current biometric information just provided by the person 16 is recognized by comparing it to previously collected biometric information from the database 20 of FIG. 3A. If the current biometric information just provided by the person 16 is recognized, the identity of the person 16 is confirmed.

In step 102, which is optional, the LEO 14 via the mobile data terminal 30 may then issue a citation to the person 16. In step 104, also optional, may allow the person issued the citation remotely pay a fee associated with the citation via their mobile device. This can be done using a variety of different methods, such as PayPal, credit card, Apple Pay, Google Wallet, and/or any other type of remote payment system.

The method disclosed in FIG. 6 has the distinct advantage in that the LEO 14 does not need to be in close vicinity of the person 16. By so doing, this allows the LEO 14 to be safely located within the LEO vehicle 10 and prevents any physical interactions between the LEO 14 and the person 16. If such a situation arises where the person 16 cannot be identified or is determined to be disrespectful to authority due to a previous record, the LEO 14 can call for backup. As such, this significantly reduces any danger to either the LEO 14 or the person 16.

As stated in the previous paragraphs, in order to identify the person 16, previously collected biometric information should be available to the mobile data terminal 30 via the cloud 18. As such, the database 20 must already have collected biometric information. In an effort to explain how this biometric information is collected, a brief description will be made how current government-issued identifications, including driver's licenses, are issued.

Figure 7:
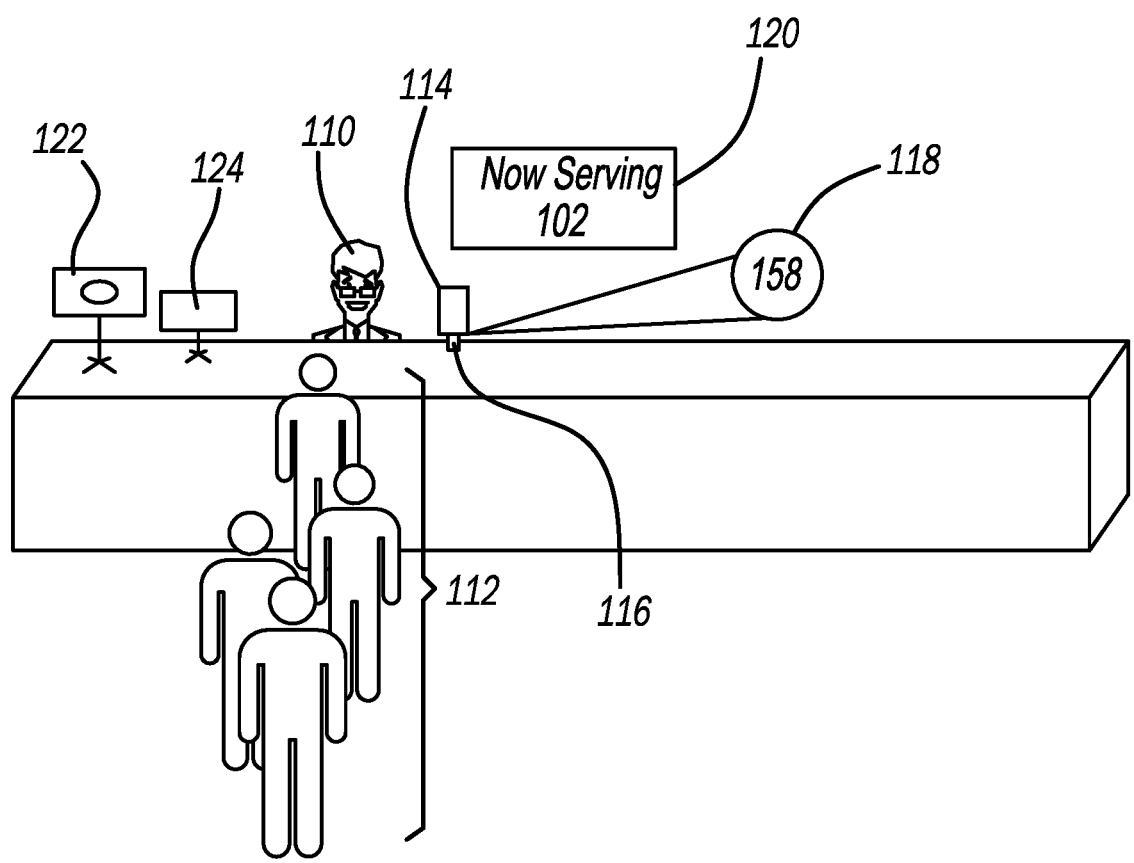
FIG. 7 illustrates a prior art procedure for obtaining a government-issued ID.

As shown in FIG. 7, it is routine that the government entity issuing the ID has a person 110 to interact with one or more customers 112. In some circumstances, the customers 112 must wait in line. This wait can be extremely lengthy. As such, some government offices issue tickets from a ticket dispenser 114. The ticket dispenser issues a ticket 116 that usually has a number 118 on it. A large external display 120 usually indicates which customer it is now serving. The number displayed by the display 120 is indicative of the number on the ticket, and so when the number on the ticket is displayed on the display 120, that customer is now ready to be served by the government employee 110. Again, this wait can be extremely long and burdensome to the customers 112.

Once a customer 112 is ready to be served by the person 110, the customer usually has to provide some form of picture information via a camera 122. Additionally, information of the customer 112 is also inputted usually by the person 110 on a computing device 124. All in all, this is a fairly burdensome task, as it requires the person 110 to correctly input information they are only just now receiving from the customer 112. Additionally, as to pictures on government-issued IDs, most people will complain that they are unhappy with their picture because they did not know that the camera 122 was being actuated by the government employee 110, leaving them with an awkward looking picture.

Figure 8A:
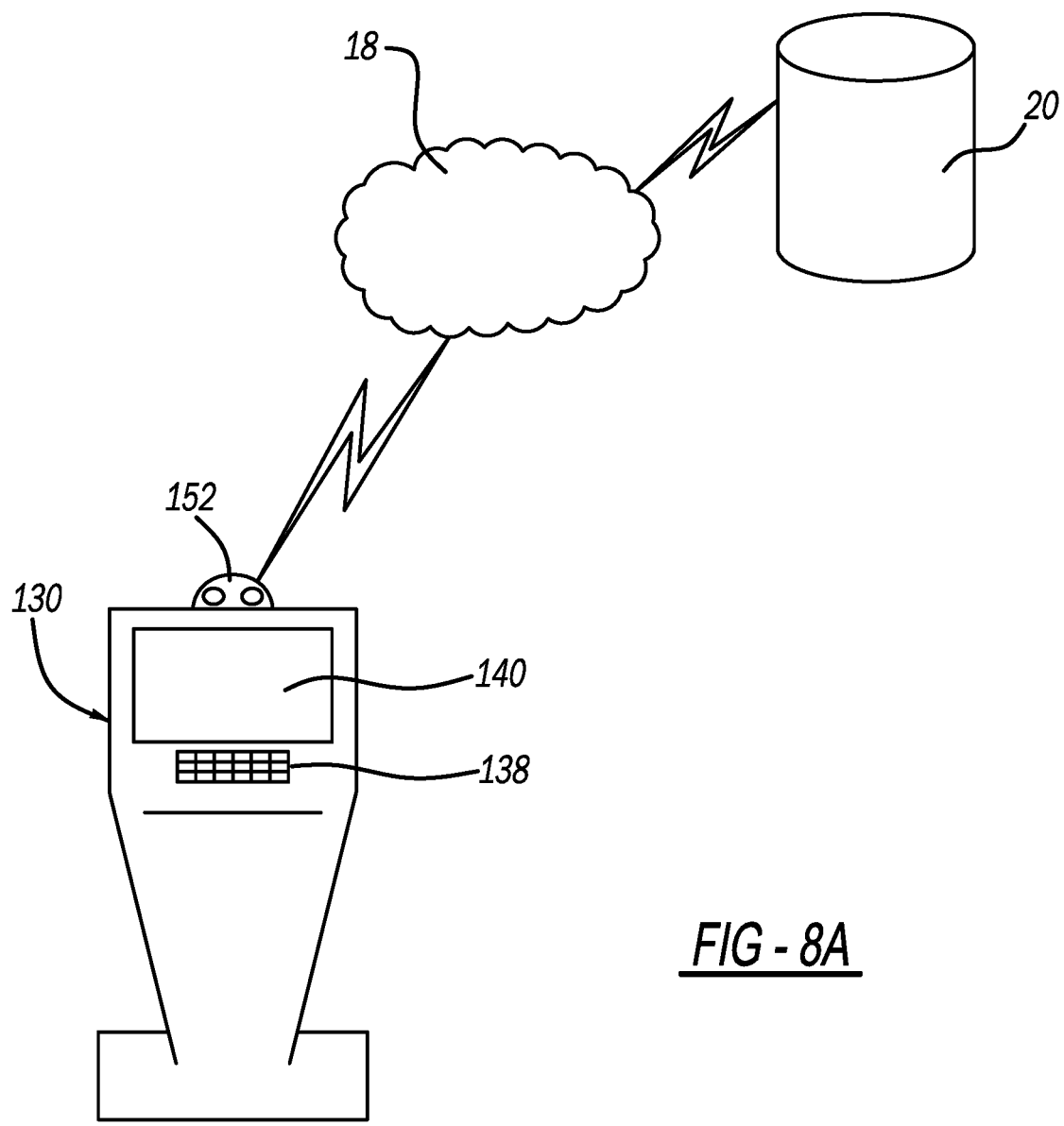
FIGS. 8A and 8B illustrate a data collection device for collecting data of the person, including biometric information, this is the full-KYC (full Know Your Customer) situation.
Figure 8B:
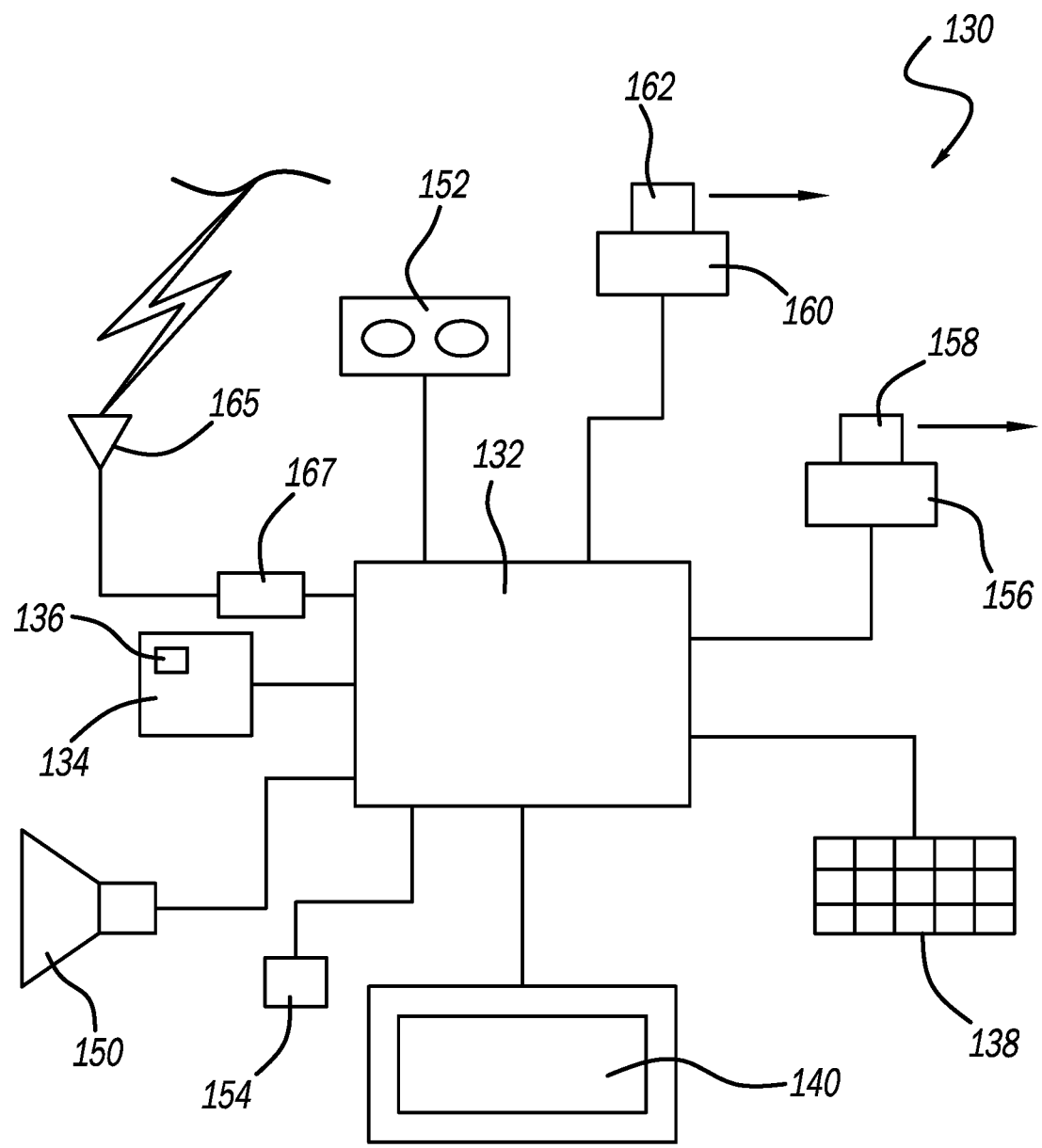

Referring to FIGS. 8A and 8B an improved system for collecting biometric and/or other information is shown. The process at its simplest level is as follows. The driver with a valid driver license goes to a participatory office and renews the driver license through the kiosks. It is a simple 1, 2, 3 process. They swipe current driver's license. They confirm their address information. They can then renew their photograph. They may take as many photographs as they want. They then pay for that license by swiping the credit card through the same portable kiosk. Notable features of the digital driver's license renewal are that it will account for language, Spanish, Arabic and English (of course perhaps others in the future). It will account for donor volunteers. And most importantly it will account for superior biometric verification that ensures that the holder of this license is indeed who they say they're when being approached by LEO. That is accomplished through voice-recognition and/or facial-recognition; while collecting traditional identification features such as signature and fingerprints.

The second part of the process is around LEO. Police officer today uses in-car telematics. With the advent of digital driver's license, the officer could use a tablet (with many features/manufacturers) distributed by the police department. With the DriverVerify process the officer can confirm that the driver of a particular vehicle when pulled over is indeed that driver by simply calling the registered phone number that was given during the driver's license renewal and ask him to speak their name as it appears in the driver's license to confirm they are really who they say they are. This would all be done in the cloud. At that point the officer has the option to do further inspection by approaching the car because they feel safer that the person who they think they are and is not someone that would be on for the various list that is maintained by the government for drivers that have had various sort of violations; from felony violations, associated with arms violations for example, sexual offenders, DUIs. All those things the officer would know before getting out of the car because of the voice/face recognition that happens in the cloud through/over the phone network.

Lastly because the driver doesn't even leave the car, which by the way eliminates the risk today the officer takes when they get out of the car and have to be concerned about oncoming traffic. Beyond the concept of being safer in case it's a dangerous person in the vehicle it is also less dangerous to not have to approach the car at all because of oncoming traffic.

The process, in addition, may include electronic payment. The driver that is given a citation should be afforded an opportunity to acknowledge that they were speeding and accept the violation over the phone and agree to either have the ticket information emailed to them and they should be able to pay for it on the spot with Apple Pay (or another similar mechanism). In most cases, there are touchless ways to pay for it. And of course they can always give you credit card information over the phone to the police officer, and he could load it into the tablet.

Most noteworthy about this approaches is that whether performing normal duties of issuing traffic citations or for confirming a passenger in a car that may be associated with illegal activities it will no longer be necessary for the LEO to leave his car.

What is accomplished is that the police officer is safe until he knows who is in the other vehicle and in routine traffic violations he protects himself from traffic endangerment, as noted by new laws requiring lane change.

Also, we will say that when a driver is pulled over or when the driver needs to show ID at a Supermarket or an airport the same driver's license would have qr-codes so that it can be read and used as identification in other instances. The electronic driver's license can confirm identity by going to the cloud because it's cloud-based, would also confirm automatically other features such as that the insurance is in enforced, which is required, for example, in the state of Michigan. It would also show their donor status.

Here, the system 130 is shown in the form of a kiosk but may take any one of a number of different forms. The kiosk 130 is in communication with the database 20 via the cloud 18. The system 130 may include a processor 132 that is in communication with the memory 134. The memory contains instructions 136 for executing any one of a number of different methodologies disclosed in this specification.

The processor 132 may be connected to an input device 138 such as a keyboard or touchscreen, to receive information from the person 16, such as the name, address, and other information of the person 16. The processor 132 is also in communication with the display device 140 for displaying information to the person 16 using the system 130.

A speaker 150 may be also connected to the processor 132 to relay audio information to the person using the system 130. In order to collect biometric information, the processor 132 may also be in communication with the camera 152. The camera 152 may be single lens camera capable of capturing a two-dimensional image or may be a multi-lens camera capable of capturing three-dimensional image information.

For example, the person utilizing the system 130 could be required to provide a picture of their face. A single lens camera can provide two-dimensional facial image capture information, while a camera having two or more lenses can provide three-dimensional facial information. This information can form part of the biometric information collected from the person that is used to identify the person in the event the person is pulled over by an LEO.

Additionally, a microphone 154 may also be connected to the processor 132 so as to collect voiceprint information from the person using the system 130. Again, this voiceprint information could be considered biometric information and would be stored in the database 20. When providing a voiceprint, any one of different methodologies may be employed, such as providing the person utilizing the system 130 to state their full name.

As stated before, a keyboard 138 may be utilized to provide information to the processor 132, but also a card reader 156 may also be in communication with the processor 132. The card reader could be configured to read information from a government issued ID 158 of a person when it is slid or interacted with the card reader 156. The card reader 156 may be a magnetic card reader but could also take other forms such as an optical card reader or capable of being a near field communication card reader.

The person utilizing the system can interact with the system to perform any one of a number of different services that would normally be performed by the person 110 of FIG. 7. Here, the system 130 can allow a person 16 to be the one that actually inputs the information, as the person 16 is in the best position to know what information is actually correct.

Also, the person 16 will have the ability to interact with the system such that the camera 152 will only take a picture when the customer is ready for the picture to be taken. This generally would result in the picture portion of a government issued ID to be much more agreeable to the person whose ID it is.

The processor 132 may also be in communication with a separate card reader 160 that is capable of processing credit card payments via a credit card 162 that is slid through the card reader 160. Of course, the card reader 160 can take a number of different forms and may be able to receive information from the credit card 162 electronically, such as using the chip located on the credit card 162. Additionally, the card reader 160 may be a near field communication system capable of receiving payment information from the mobile device such as Apple Pay or Google Wallet.

In order to communicate with the database 20 via the cloud 18, the system 130 may also be equipped with antenna 165 and the network access device 167 in communication with the processor 132. This essentially allows information provided by the person 16 to the system 130 to be uploaded to the database 20 via the cloud 18. As stated before, this information could include identifying information of the person 16 but could also include biometric information of the person 16 as well.

Figure 9:
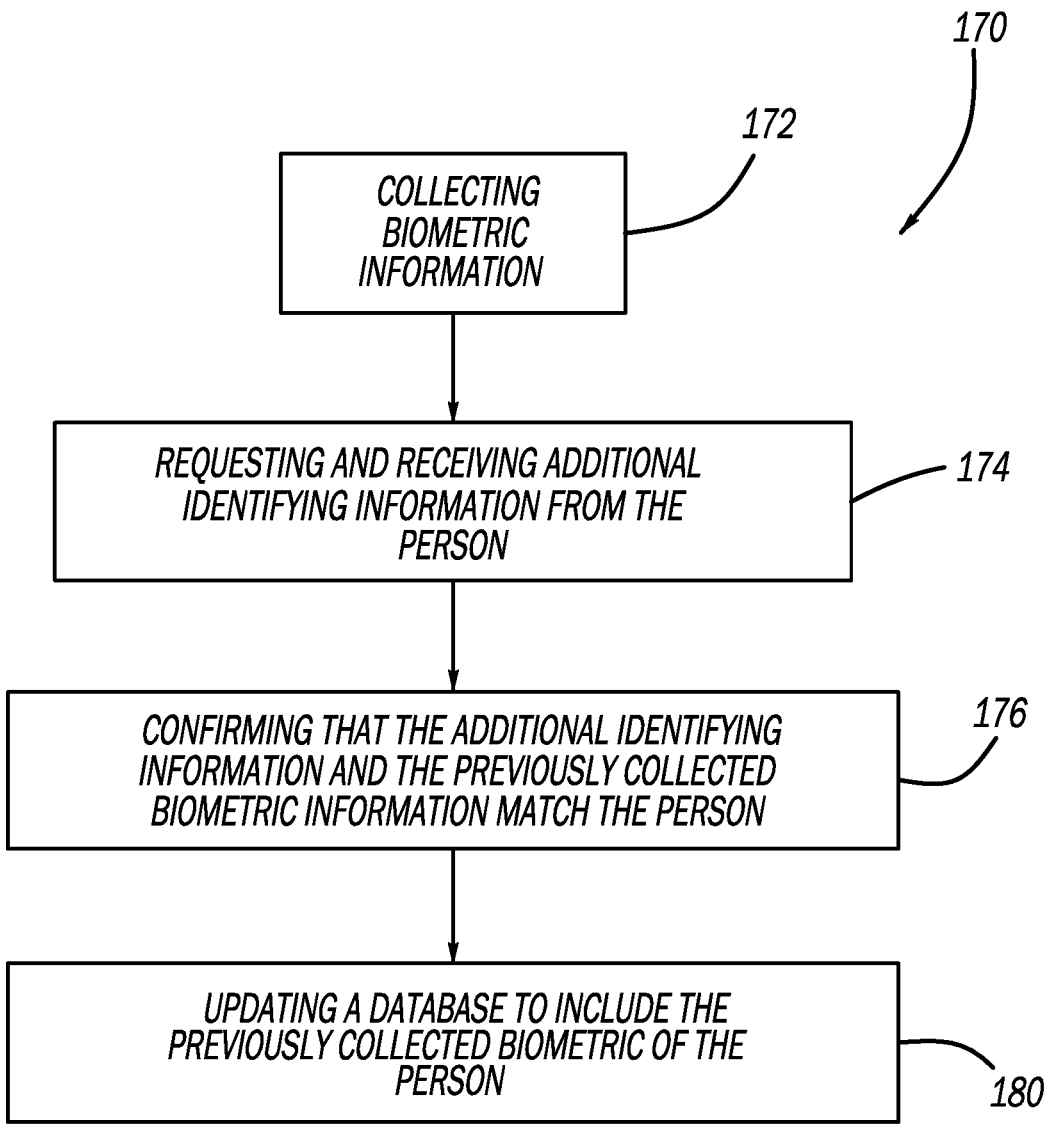
FIG. 9 illustrates a method for collecting data of the person, including biometric information, this is the full-KYC (full Know Your Customer) situation.

Referring to FIG. 9, one method 170 to be executed by the processor 132 of the system 130 is shown. Here, in step 172 the system 130 collects biometric information. As stated before, the biometric information may be image information captured by the camera 152, voice information captured by the microphone 154 or could perhaps be any other form of biometric information. In step 174, the system 130 requests and receives additional identifying information from the person. This additional information from the person 16 could include swiping by the person 16 their government-issued ID 158 through the card reader 156.

In step 176, the system 130 confirms that the additional identifying information and the previously biometric information of step 172 match the person. In step 180, the system 130 updates the database to include the previously collected biometric information of the person.

While it will be appreciated that the system 130 may be embodied as a kiosk, it should be understood that the 130 could take any one of a number of different forms. For example, it should be understood that the system 130 may be utilized and executed by a mobile device 200 of the person. This mobile device 200 may be the same mobile device 50 mentioned in the previous figures or may be a separate mobile device.

Figure 10A:
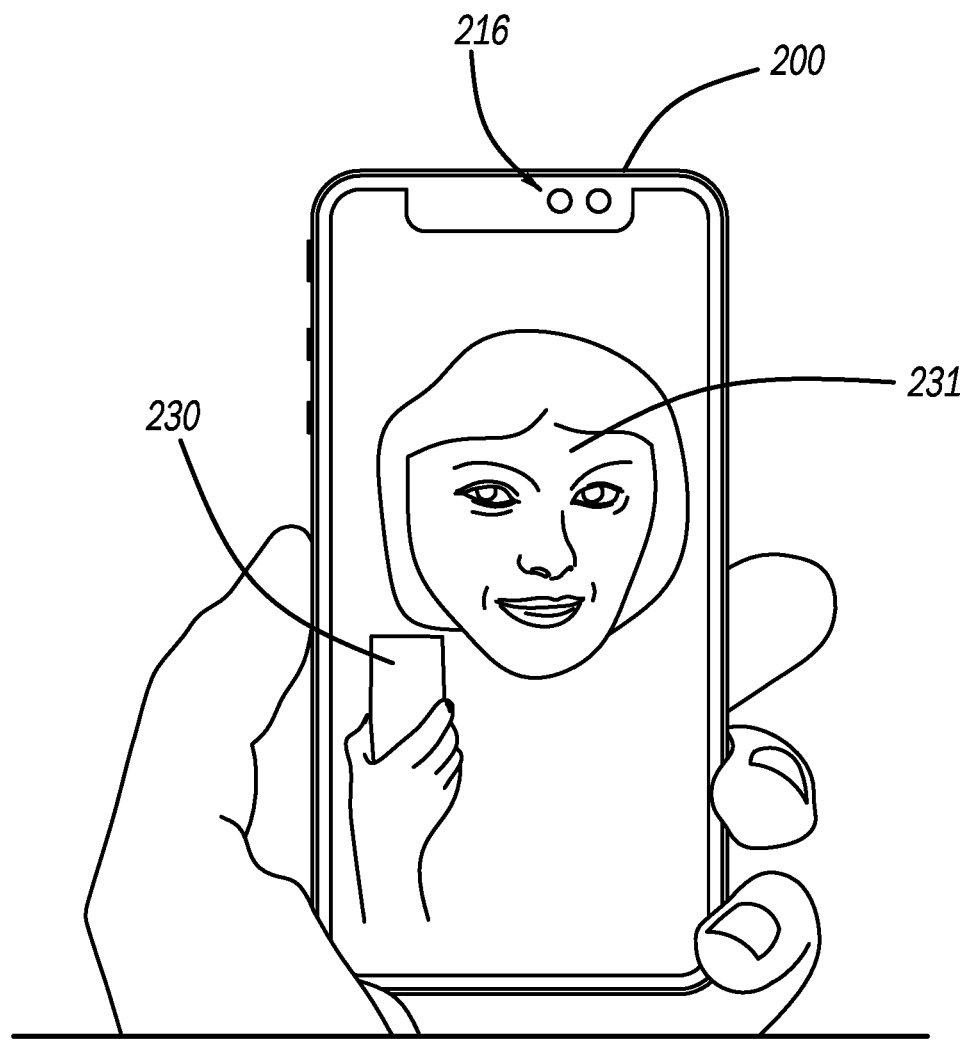
FIGS. 10A and 10B illustrate a mobile device utilized to collect data of the person, including biometric information, this is the partial-KYC (partial Know Your Customer) situation.
Figure 10B:
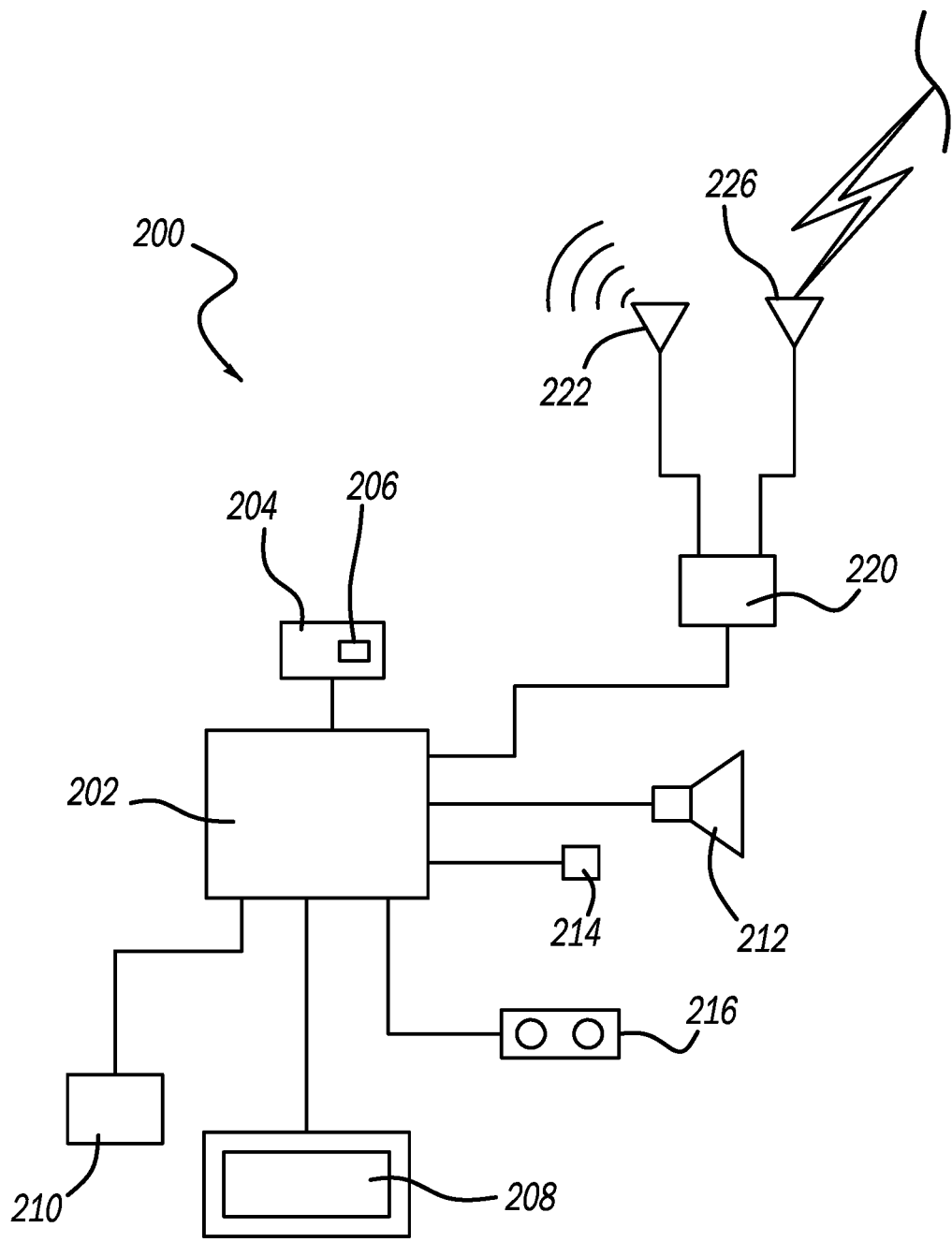

The mobile device 200 has many of the same elements mentioned in FIG. 8B. For example, referring to FIG. 10B, the mobile device 200 generally includes a processor 202 which may be a single processor or may be multiple processors working together. The processor 202 may be in communication with the memory device 204, which may be a solid-state memory, magnetic memory, optical memory, or any memory capable of storing digital information. The memory 204 may include instructions 206 for configuring the processor 202 to execute any one of a number of the methods disclosed in this specification. In communication with the processor 202 is also a display device 208 and a touchpad 210. The touchpad 210 may be incorporated into the display 208 to overlay the display 208.

As to audio-related devices, the processor 202 may be in communication with a speaker 212 and a microphone 214. A camera 216 may also be in communication with the processor 202. The camera 216 could be a single lens camera capable of collecting two-dimensional image information or could be a multiple-lens camera capable of collecting three-dimensional image information.

The processor 202 is also in communication with a network access device 220 that is in communication with one or more antennas 222 and 224. In this example, the antenna 222 is able to transmit and receive cellular information while the antenna 224 is able to transmit other forms of digital information. As such, the mobile device 200 is capable of collecting biometric information from the person utilizing the microphone 214 or the camera 216. Also, the additional information could be provided by taking a picture of the person 16 using the mobile device 200 along with their government issued I.D. 230. This allows the system to verify that the captured image information of a person's face 232 matches the ID 230.

However, it will be appreciated that allowing a person 16 to provide their biometric information via a mobile device 200 as opposed to going into a government office where a kiosk 130 is located can cause some concerns regarding confirming the identity of the person 16.

As such, the person 16 providing their biometric information using a mobile device 200 may be required to provide later their biometric information using a kiosk 130 or some additional way so as to confirm better that the biometric information collected is truly that persons biometric information. This type of methodology is disclosed in FIG. 11.

Figure 11:
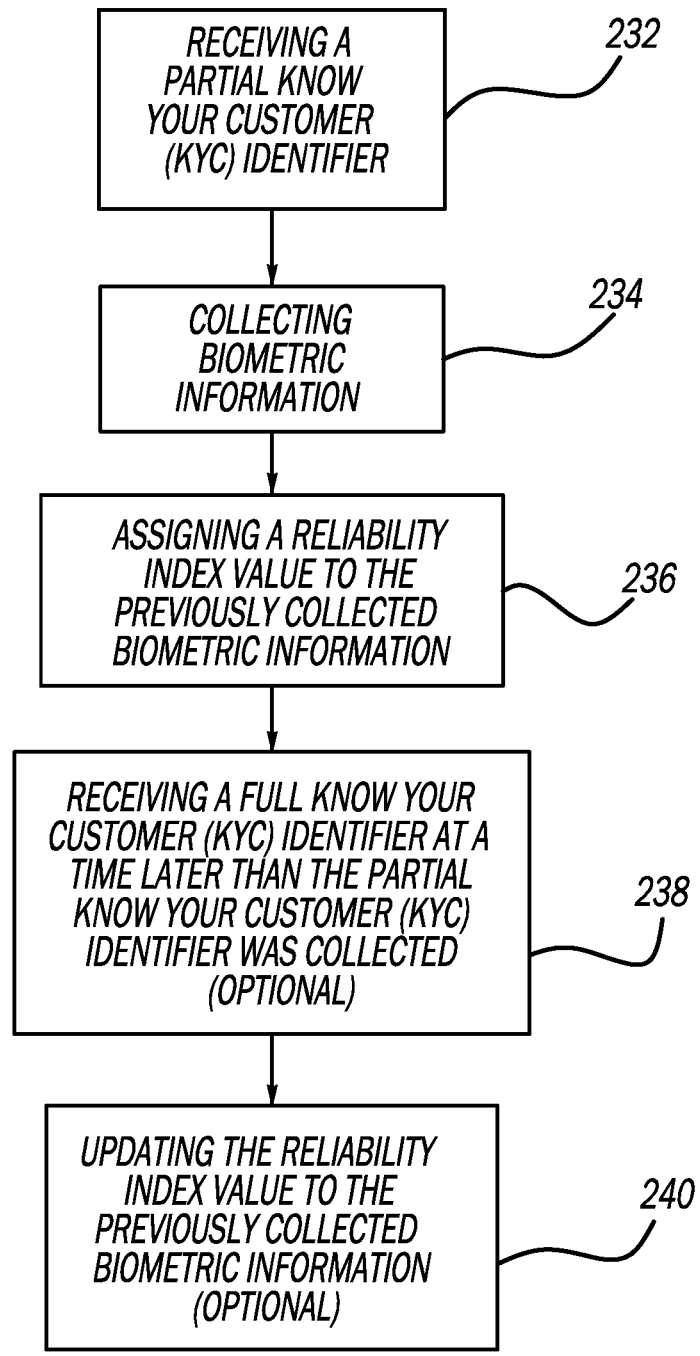
FIGS. 11 and 12 illustrate a methodology for collecting data of the person, including biometric information, with either a partial know your customer ("KYC") identifier or a full KYC identifier.

In FIG. 11, in step 232, the mobile device 200 receives a partial know your customer or KYC identifier. KYC is the process of a business identifying and verifying the identity of its clients. The term is also used to refer to the bank and anti-money laundering regulations which governs these activities. KYC processes are also employed by companies of all sizes for the purpose of ensuring their proposed agents, consultants, or distributors are anti-bribery compliant. Banks, insurers, and export creditors are increasingly demanding that customers provide detailed anti-corruption due diligence information.

This KYC identifier could be a picture of the license but not the actual license. In step 234, biometric information is collected. Again, this biometric information could be collected by the microphone 214 of the mobile device 200 or by the camera 216 of the mobile device 200.

In step 236, a reliability index value is assigned to the previously collected biometric information. This reliability index value will be generally less for biometric information collected from a mobile device 200 than from a kiosk 130. As stated before, the reason for assigning a reliability index value is to provide some type of indication of how reliable the information provided by the person 16 actually is. If the person goes to a government location and utilizes the kiosk 130, this is a good indication that the information collected from the kiosk 130 is reliable.

However, if the person 16 only provides information remotely via their mobile device 200, there is a significant question regarding the reliability of this information, as the person 16 may take steps so as to provide false or misleading information. Information collected remotely would then be provided a reliability index value that is lower than the reliability index value of information collected at the kiosk.

In step 238, which is optional, the user may provide a full KYC identifier at a time later than when step 232 was collected. For example, the person could go to the kiosk 130 in a government-run location to provide this information. In step 240, which is also optional, which is also optional, because this information was now collected at a kiosk and not via a person's mobile phone 200, the reliability index value can be updated to indicate that the information collected is more reliable.

Figure 12:
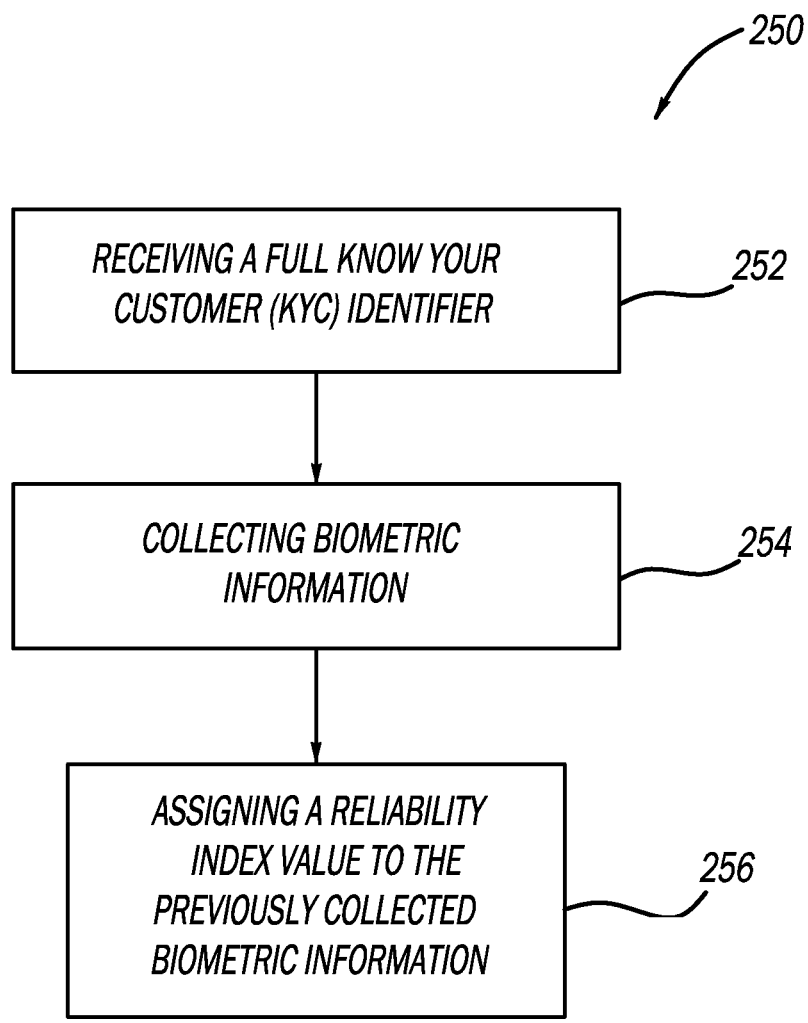

Referring to FIG. 12, this is a situation wherein a full know your customer identifier is provided. The method of 250 begins with step 252 where the system receives a full know your customer identifier. In step 254, biometric information is collected, and in step 256, a reliability index value is assigned to the previously collected biometric information of step 254. Because a full know your customer identifier was provided, the reliability index in this situation would be higher than a reliability index assigned in step 236 of FIG. 11. Again, this situation would be more utilized when the person goes into a government-issued location and provides a full KYC identifier.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

Other examples of utilizing this "remote personal identification" can be to authenticate in telephone based auctioning, validating the identity of the person in a financial transaction or to access a secure area such as a data-center.

The full KYC situation, using a kiosk (or without a kiosk)n can also be used in any situation such as a private or public organization to issue organizational IDs and/provide access to specific physical or non-physical (e.g. logins etc) after validating the personal identity with human intervention.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A method for remote identification of a person, the method comprising the steps of:
   determining contact information for contacting the person by either (a) using an identifying marker to find contact information of the person using a database, the database contains data cross-referencing the identifying marker of the person to the contact information of the person and previously collected biometric information of the person or (b) using a GPS-fencing to broadcast a message to a mobile device of the person within a predetermined radius so as to invite the person to provide their contact information;
   contacting the person by either using the contact information provided from the database or receiving a phone call from the person in response to the message broadcast using the GPS-fencing and received by the person;
   after contacting the person, receiving current biometric information from the person; and
   confirming the identification of the person when the current biometric information is recognized by comparing the current biometric information is to the previously collected biometric information of the person in the database, wherein the identifying marker of the person is a license plate number of a vehicle the person is operating.

2. The method of claim 1, wherein the current biometric information and the previously collected biometric information is at least one of voice-print/voice-signature information or two dimensional and/or three dimensional facial imaging information.

3. The method of claim 2, further comprising the step of contacting the person via mobile phone of the person, wherein the contact information includes information for contacting the mobile phone of the person.

4. The method of claim 3, further comprising the step of receiving the current biometric information of the person from a microphone of the mobile phone, wherein the current biometric information is voice-print/voice-signature information.

5. The method of claim 3, further comprising the step of receiving the current biometric information of the person from a camera of the mobile phone, wherein the current biometric information is two and/or three dimensional facial imaging information.

6. The method of claim 1, further comprising the step of issuing a citation to the person after the step of confirming the identification of the person.

7. A method for remote identification of a person, the method comprising the steps of:
   determining contact information for contacting the person by either (a) using an identifying marker to find contact information of the person using a database, the database contains data cross-referencing the identifying marker of the person to the contact information of the person and previously collected biometric information of the person or (b) using a GPS-fencing to broadcast a message to a mobile device of the person within a predetermined radius so as to invite the person to provide their contact information;
   contacting the person by either using the contact information provided from the database or receiving a phone call from the person in response to the message broadcast using the GPS-fencing and received by the person;
   after contacting the person, receiving current biometric information from the person;
   confirming the identification of the person when the current biometric information is recognized by comparing the current biometric information is to the previously collected biometric information of the person in the database;
   issuing a citation to the person after the step of confirming the identification of the person; and
   allowing the person issued the citation to remotely pay a fee associated with the citation.

8. A method for remote identification of a person, the method comprising the steps of:
   determining contact information for contacting the person by either (a) using the identifying marker to find contact information of the person using a database, the database contains data cross-referencing the identifying marker of the person to the contact information of the person and previously collected biometric information of the person or (b) using a GPS-fencing to broadcast a message to a mobile device of the person within a predetermined radius so as to invite the person to provide their contact information;
   contacting the person by either using the contact information provided from the database or receiving a phone call from the person in response to the message broadcast using the GPS-fencing and received by the person;
   after contacting the person, receiving current biometric information from the person;
   confirming the identification of the person when the current biometric information is recognized by comparing the current biometric information is to the previously collected biometric information of the person in the database;
   collecting the previously collected biometric information;
   requesting and receiving additional identifying information from the person;
   confirming that the additional identifying information and the previously collected biometric information match the person; and
   updating the database to include the previously collected biometric of the person;
   wherein the additional identifying information is a driver's license of the person.

9. The method of claim 8, where the step of collecting the previously collected biometric information further comprises the step of:
   receiving a partial know your customer (KYC) identifier;
   collecting the previously collected biometric information; and
   assigning a reliability index value to the previously collected biometric information, wherein the reliability index value takes into account that the partial KYC identifier was provided.

10. The method of claim 9, further comprising the step of:
    receiving a full know your customer (KYC) identifier at a time later than the partial know your customer (KYC) identifier was collected; and
    updating the reliability index value to the previously collected biometric information, wherein the reliability index value takes into account that the full KYC identifier was provided at the later time.

11. A system for remote identification of a person, the system comprising:
    a cloud based database, the cloud based database having data cross-referencing an identifying marker of the person to contact information of the person and previously collected biometric information of the person;

a mobile data terminal, the mobile data terminal being configured to communicate with the cloud based database and the person; and wherein the mobile data terminal is configured to:
receive an identifying marker of the person,
transmit the identifying marker to the cloud based database,
receive contact information of the person from the cloud based database;
contact the person using the contact information provided from the database,
receive current biometric information from the person,
transmit current biometric information from the person to the cloud based database,
receive a confirmation communication of the identification of the person from the cloud based database when the current biometric information is recognized by comparing the current biometric information to the previously collected biometric information of the person in the cloud based database; and
wherein the mobile data terminal is configured to electronically issue a citation to the person and the identifying marker is received from a driver's license of the person.

12. The system of claim 11, wherein the current biometric information and the previously collected biometric information is at least one of voice-print/voice-signature information or two dimensional facial imaging information or three dimensional facial imaging information.

13. The system of claim 12, wherein the mobile data terminal is configured to contact the person via mobile phone of the person, wherein the contact information includes information for contacting the mobile phone of the person.

14. The system of claim 13, wherein the mobile data terminal is configured to receive the current biometric information of the person from a microphone of the mobile phone, wherein the current biometric information is voice-print/voice-signature information.

15. The system of claim 13, wherein the mobile data terminal is configured to receive the current biometric information of the person from a camera of the mobile phone, wherein the current biometric information is two and/or three dimensional facial imaging information.

16. The system of claim 11, wherein the mobile data terminal is configured to electronically issue a citation to the person.

17. The system of claim 11, further comprising:
a data collection device, the data collection device having inputs for receiving biometric information from the person and additional identifying information of the person;
the data collection device being configured to communicate with the cloud based database;
the data collection device being configured to:
collect the previously collected biometric information, request additional identifying information from the person,
confirm that the additional identifying information and the previously collected biometric information match the person; and
update the cloud based database to include the previously collected biometric of the person.

18. The system of claim 17, wherein the data collection device is configured to:

receive a partial know your customer (KYC) identifier;
collect the previously collected biometric information; and
assign a reliability index value to the previously collected biometric information, wherein the reliability index value takes into account that the partial KYC identifier was provided.

19. The system of claim 18, wherein the data collection device is configured to:
collecting a full know your customer (KYC) identifier at a time later than the partial know your customer (KYC) identifier was collected; and
update the reliability index value to the previously collected biometric information, wherein the reliability index value takes into account that the full KYC identifier was provided at the later time.

20. The system of claim 17, wherein the data collection device is configured to:
receive a full know your customer (KYC) identifier;
collect the previously collected biometric information; and
assign a reliability index value to the previously collected biometric information, wherein the reliability index value takes into account that the full KYC identifier was provided.

21. The system of claim 11, further comprising a mobile phone application executing on a mobile device of the person, the mobile phone application configures the mobile device to transmit and share an electronic driver license, receive GPS-fenced broadcast messages, and transmit voice-print/voice-signature and two-dimensional/three-dimensional facial image.

22. A system for remote identification of a person, the system comprising:
a cloud based database, the cloud based database having data cross-referencing an identifying marker of the person to contact information of the person and previously collected biometric information of the person;
a mobile data terminal, the mobile data terminal being configured to communicate with the cloud based database and the person; and
wherein the mobile data terminal is configured to:
receive an identifying marker of the person,
transmit the identifying marker to the cloud based database,
receive contact information of the person from the cloud based database;
contact the person using the contact information provided from the database,
receive current biometric information from the person,
transmit current biometric information from the person to the cloud based database,
receive a confirmation communication of the identification of the person from the cloud based database when the current biometric information is recognized by comparing the current biometric information to the previously collected biometric information of the person in the cloud based database; and
wherein the identifying marker of the person is a license plate number of a vehicle the person is operating.

23. A system for remote identification of a person, the system comprising:
a cloud based database, the cloud based database having data cross-referencing an identifying marker of the person to contact information of the person and previously collected biometric information of the person;

a mobile data terminal, the mobile data terminal being configured to communicate with the cloud based database and the person; and wherein the mobile data terminal is configured to:
receive an identifying marker of the person,
transmit the identifying marker to the cloud based database,
receive contact information of the person from the cloud based database;
contact the person using the contact information provided from the database,
receive current biometric information from the person,
transmit current biometric information from the person to the cloud based database,
receive a confirmation communication of the identification of the person from the cloud based database when the current biometric information is recognized by comparing the current biometric information to the previously collected biometric information of the person in the cloud based database; and
wherein the mobile data terminal is configured to electronically issue a citation to the person and the mobile data terminal is configured to allow the person issued the citation to remotely pay a fee associated with the citation.

* * * * *